April 5, 1932. J. A. JOHNSON 1,852,578
METHOD AND APPARATUS FOR ASSEMBLING LININGS
IN RECEPTACLE CLOSURE CAPS
Filed Nov. 26, 1929   9 Sheets-Sheet 9
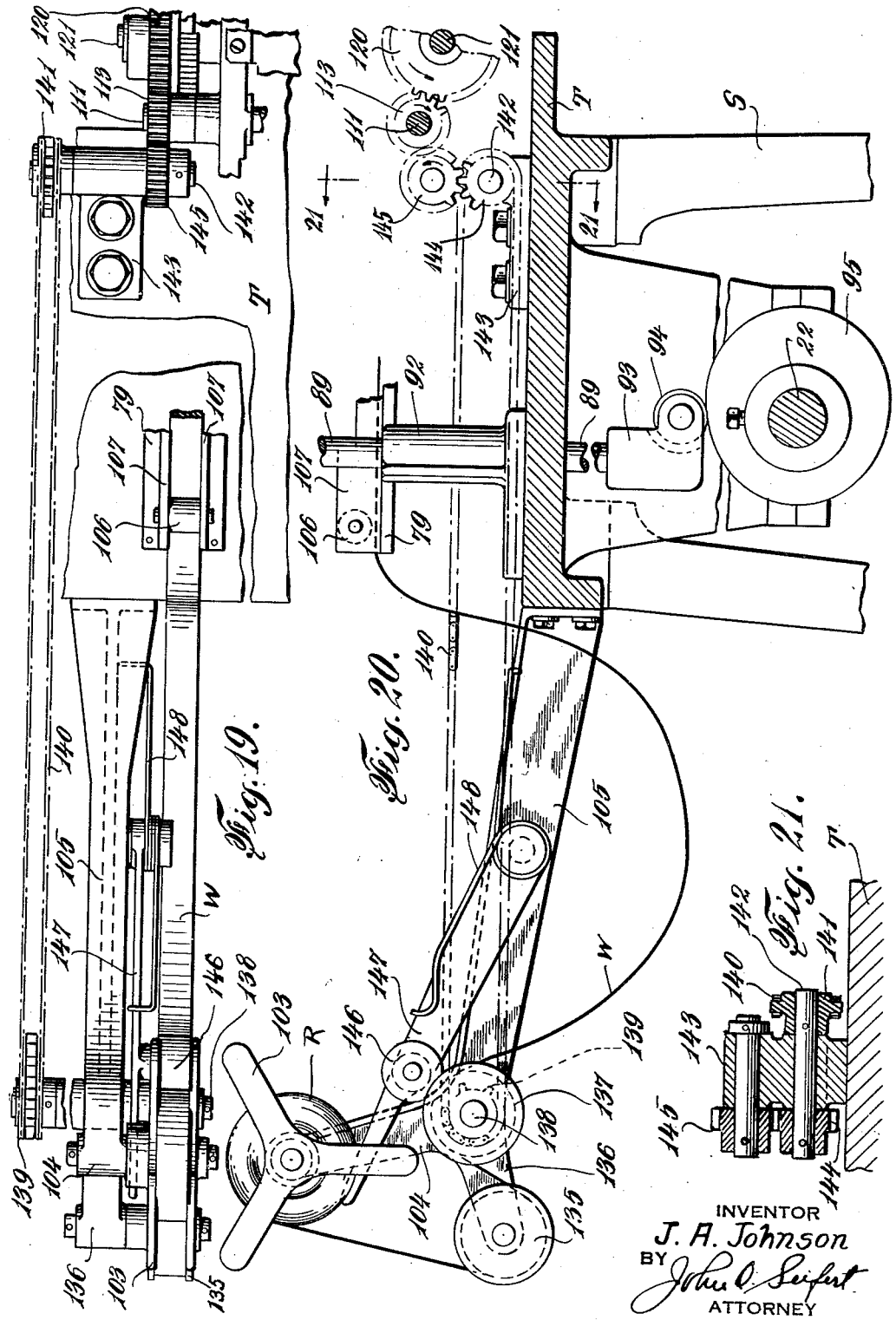
INVENTOR
J. A. Johnson
BY
ATTORNEY Patented Apr. 5, 1932

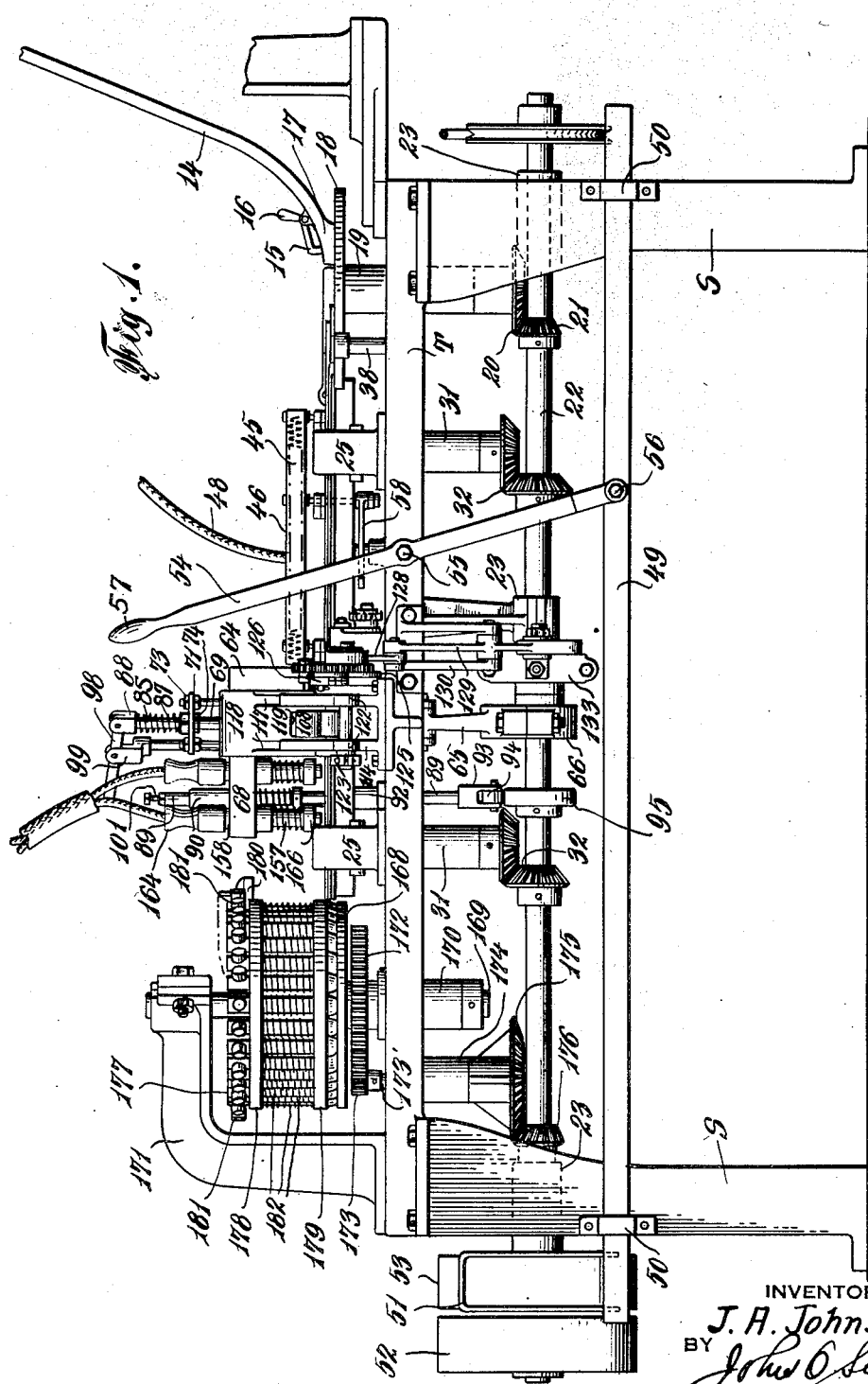

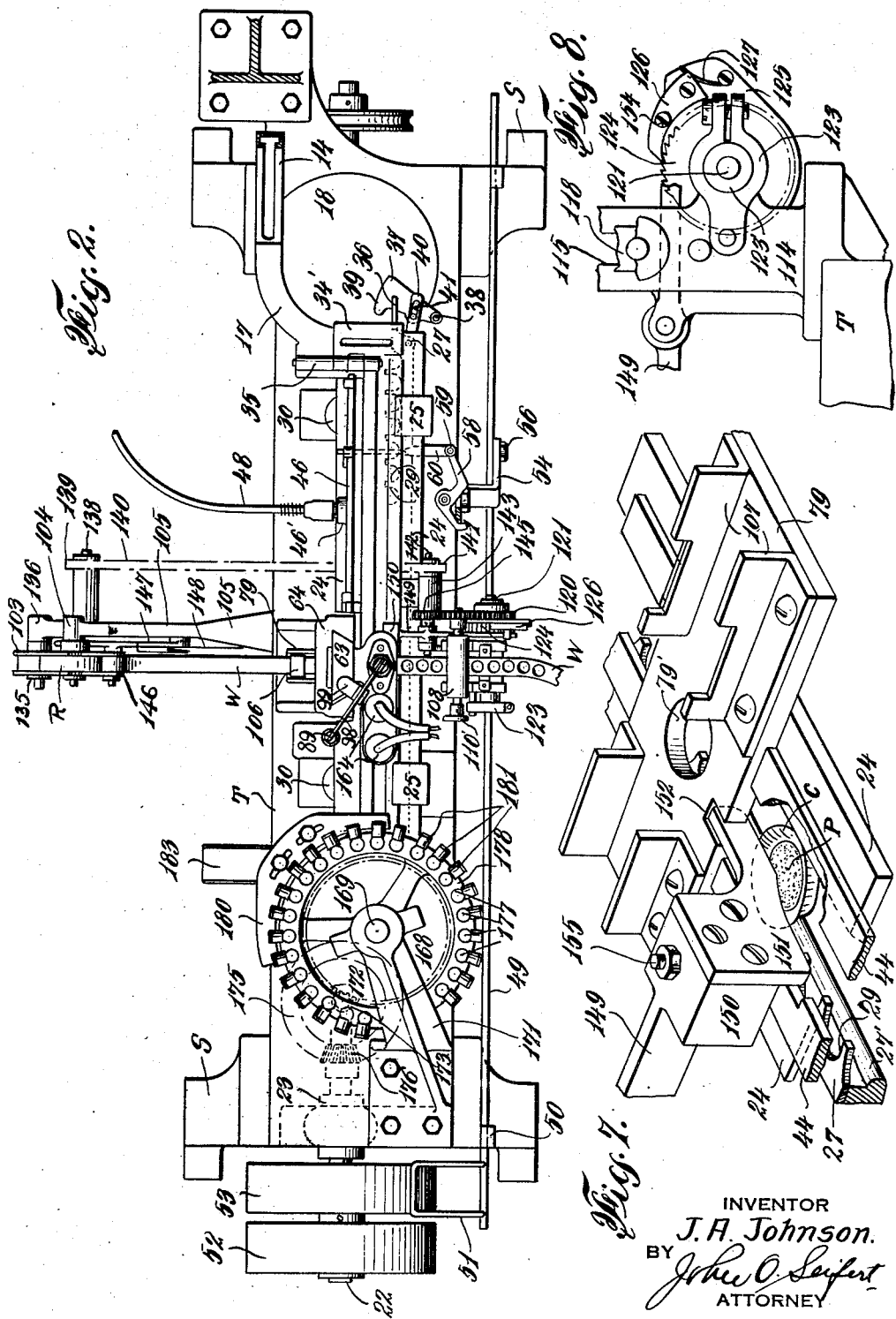

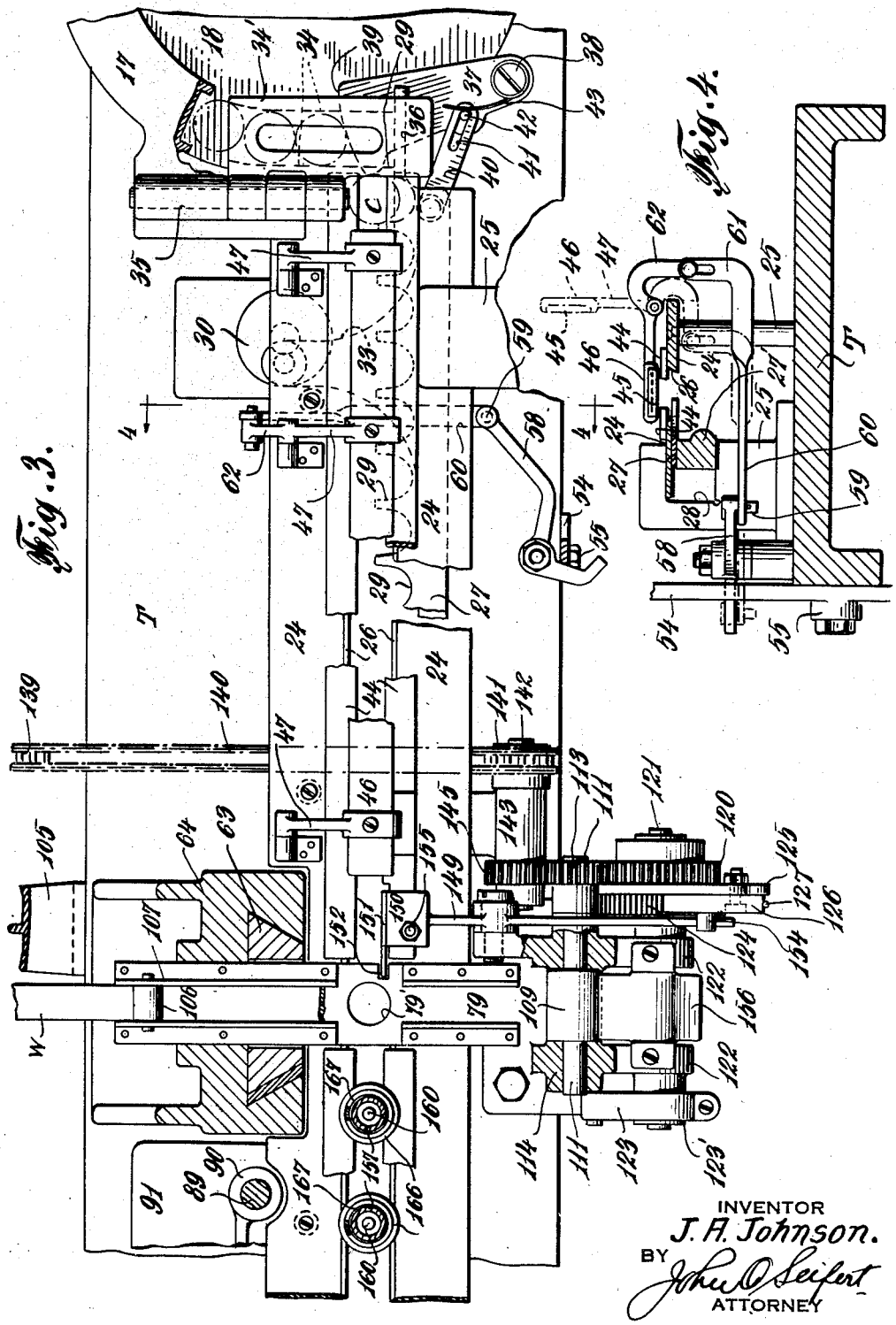

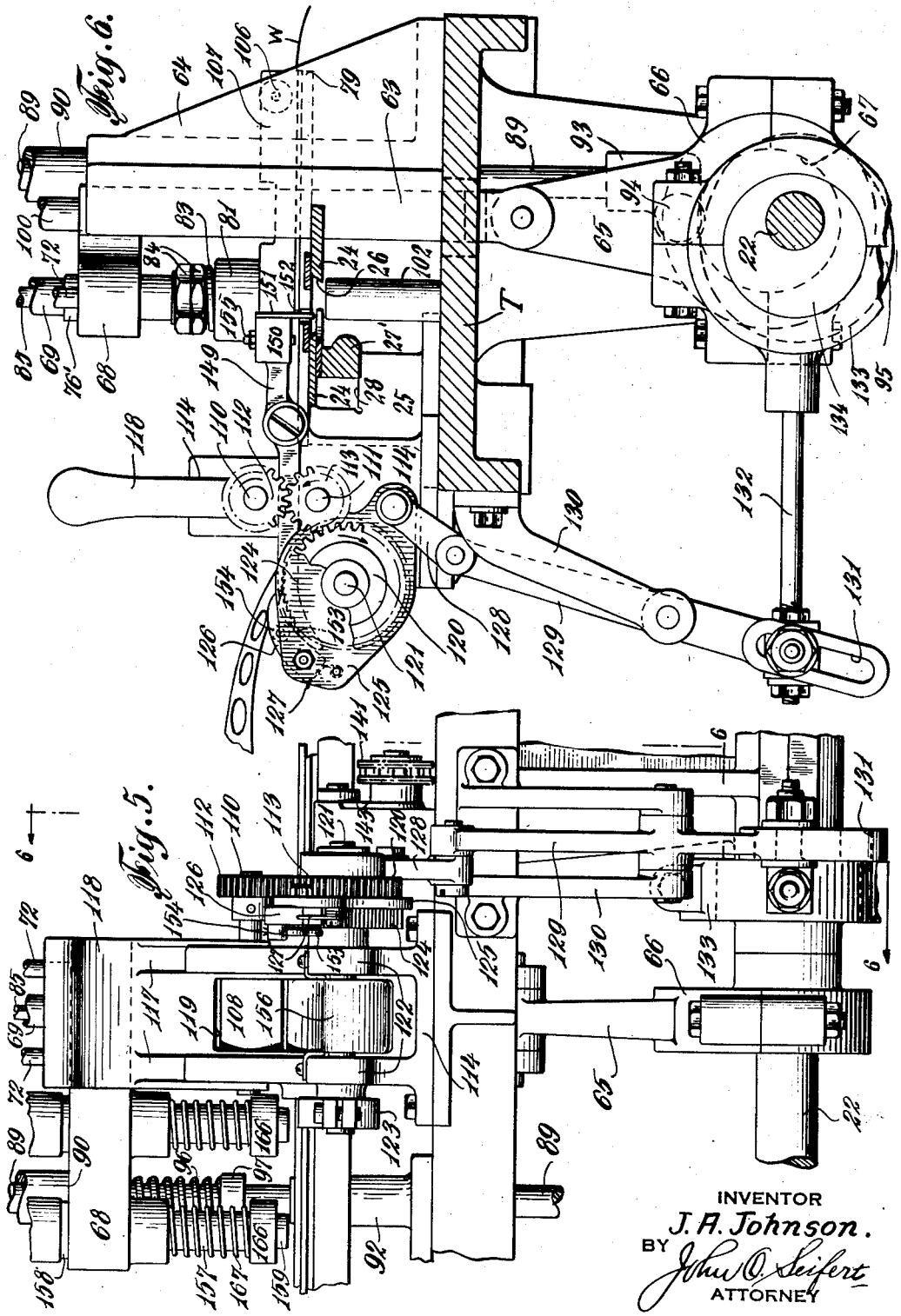

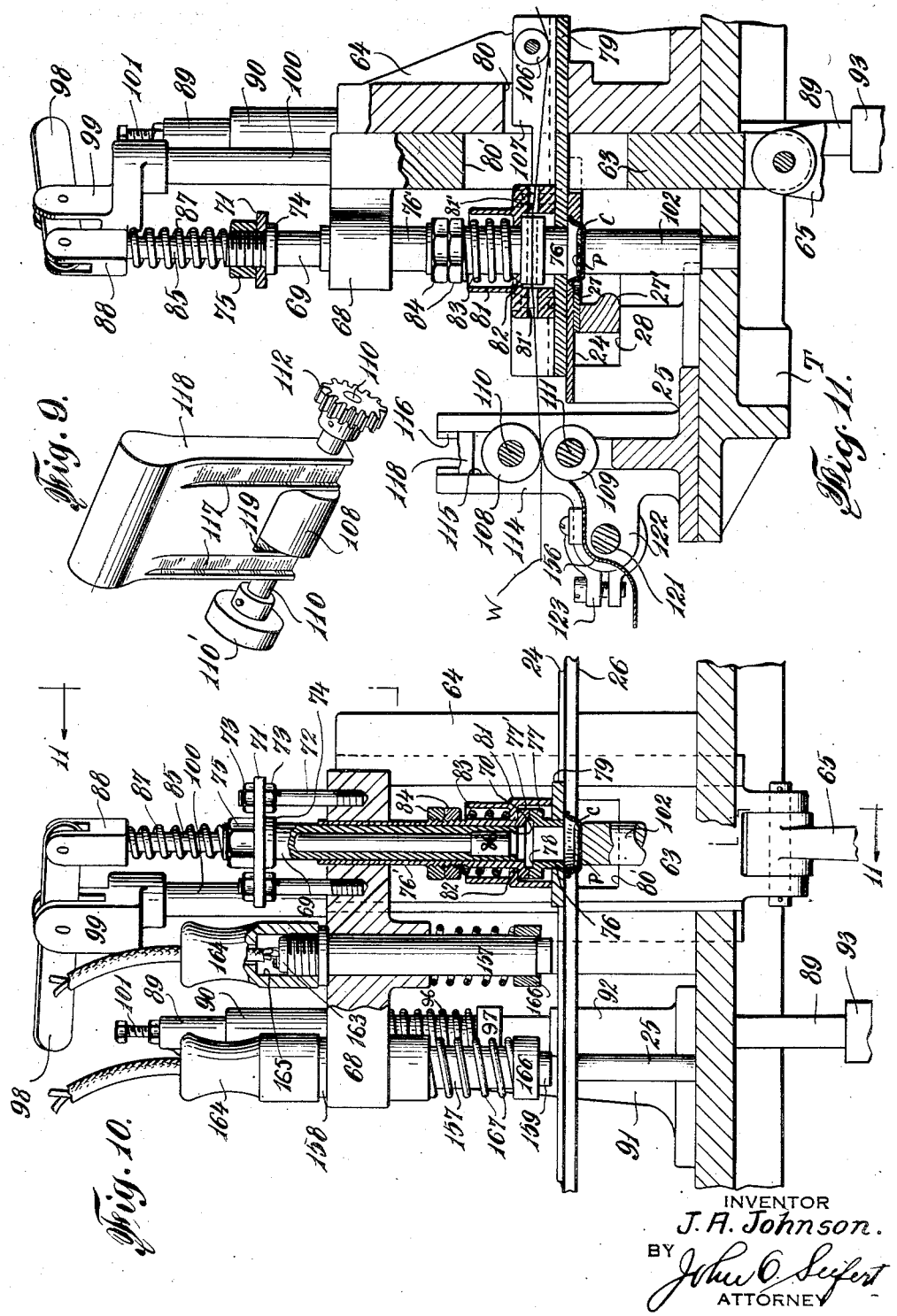

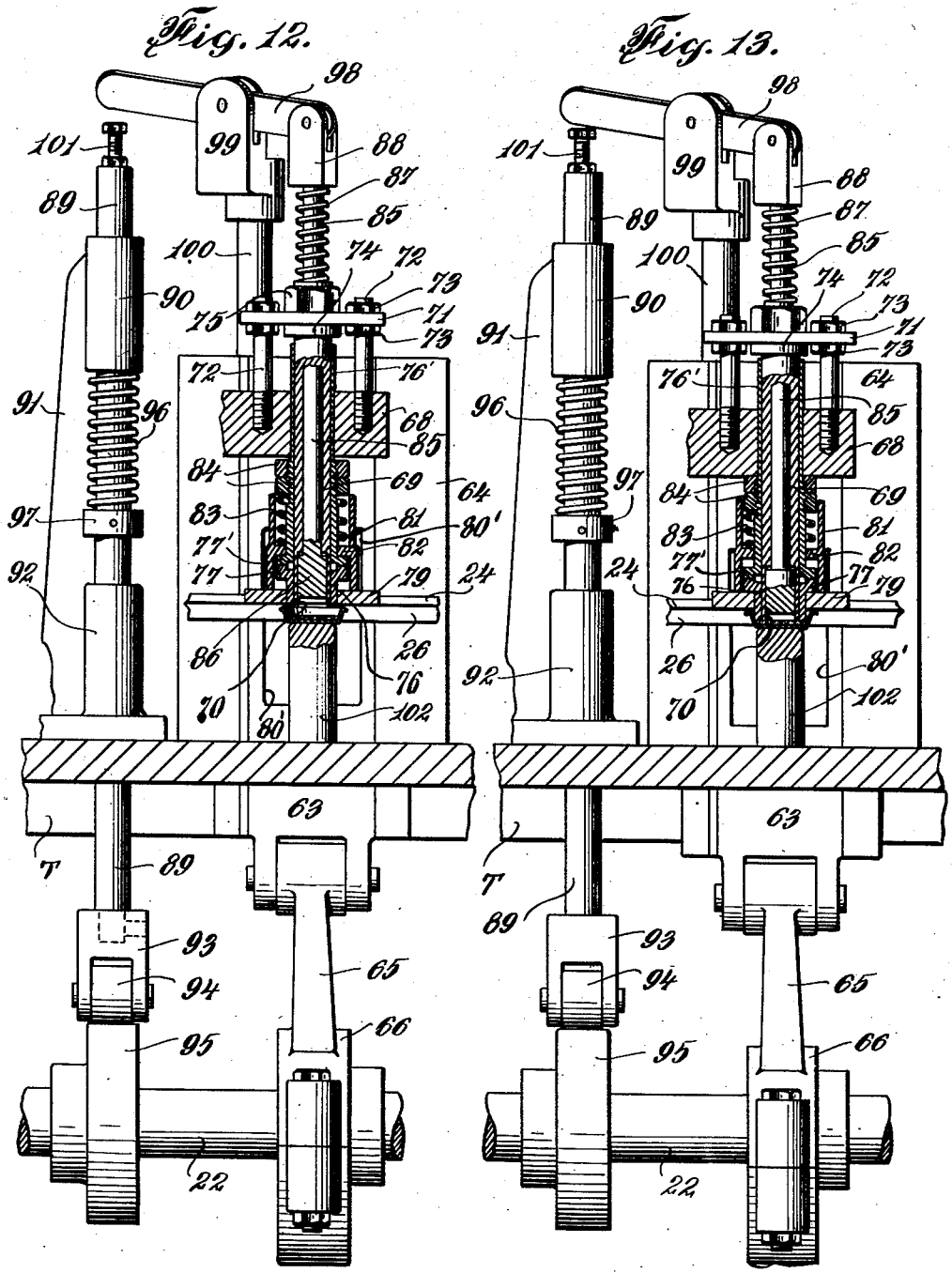

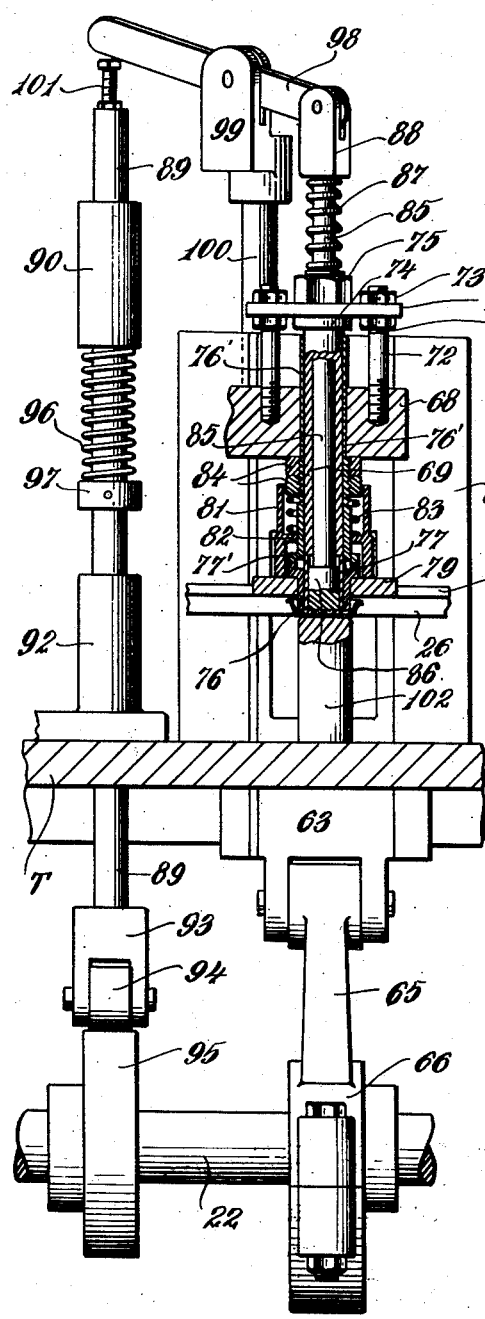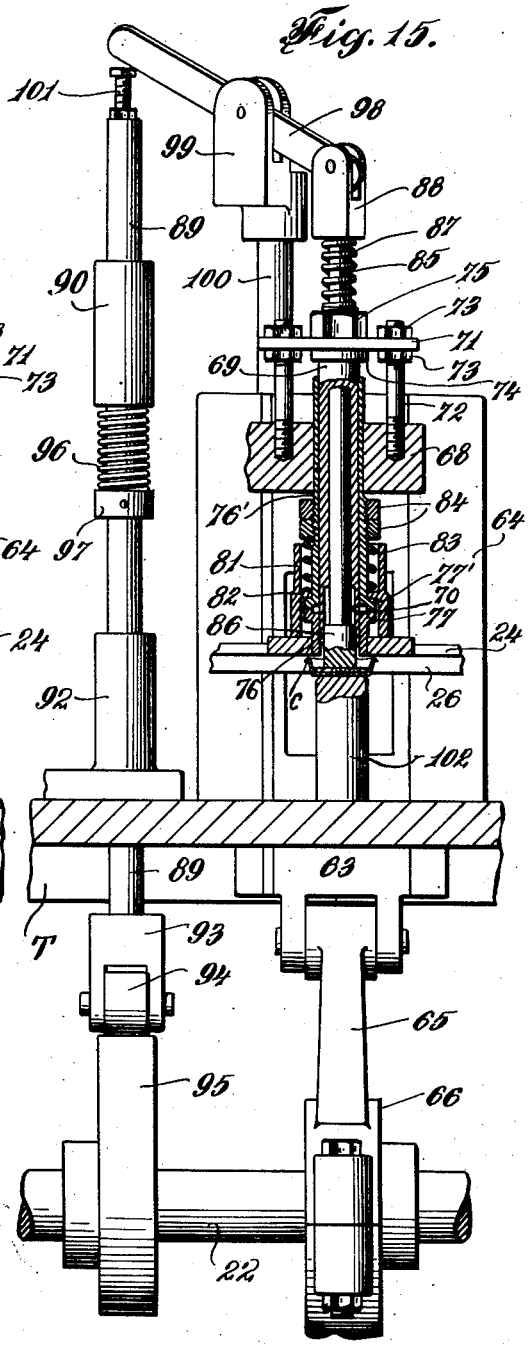

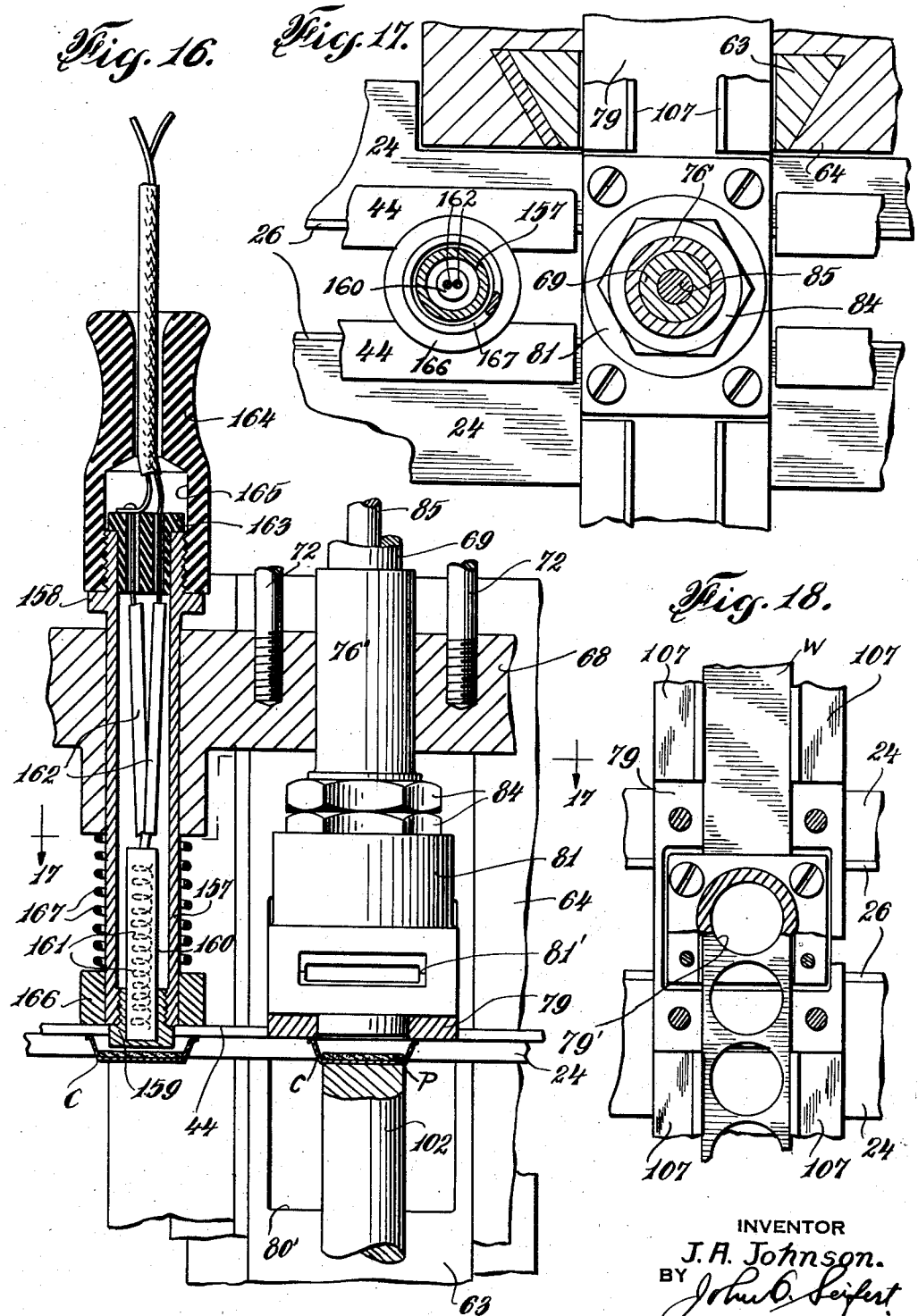

1,852,578

UNITED STATES PATENT OFFICE

JOHN A. JOHNSON, OF WOODHAVEN, NEW YORK

METHOD AND APPARATUS FOR ASSEMBLING LININGS IN RECEPTACLE CLOSURE CAPS

Application filed November 26, 1929. Serial No. 409,793.

This invention relates to assembling and adhesively securing an impervious lining to sealing pads in closure caps of the type known as "crown caps" by the heating of sealing pads in the caps, the inserting of the linings having an adhesive surface normally non-viscous in the caps with the adhesive surface abutting the heated pads rendering the said adhesive surface of the linings viscous to adhere to the pads, subjecting the pads and linings to heat and pressure to assure an intimate adhesion between the linings and pads and subjecting the caps with the pads and linings to pressure during the cooling thereof, and it is the primary object of the invention to provide an improved method and apparatus for this purpose that are highly efficient in use.

By the method and apparatus now in use for this purpose the caps with the pads before the assembling of the linings therein are passed through a zone having an elevated temperature provided by a series of gas flames which scorch the pads with the result that the assembled caps are not acceptable by merchandisers or users of the caps, and it is another object of the invention to overcome this disadvantage by providing electric heating means to produce the elevated temperature zone, which means is adjustably mounted in superposed relation to the exposed surface of the cap pads and adapted to be moved from said position to a position away from the caps when the apparatus is inoperative and thus prevent scorching of the pads and a consequent destruction of the caps.

It is still another object of the invention to provide an improved and novel means to control the delivery of caps having sealing pads from a hopper to means to feed the caps to the means to assemble the lining on the pads.

It is a further object of the invention to provide improved means to positively feed a web of impervious material from a roll of such web to punch and die mechanism to sever linings from the web and said feeding means adapted to be rendered inoperative when there are no caps on the cap feeding means relative to the punch and die mechanism, and to maintain a slack portion of the web between the roll of web and punch and die mechanism and thus prevent a sudden strain on and breaking of the web.

A further object of the invention is to provide means to guide the web of impervious material to punch and die mechanism and centrally position lining disks severed from the web relative to a pad in a closure cap.

Another object of the invention relates to means to place the impervious linings assembled on the pads in the caps under heat and pressure to render an intimate adhesion between the linings and pads.

The embodiment of the invention comprises a punch and die mechanism to which closure caps of the crown type having sealing pads therein are fed from a hopper by a slide depositing the caps with the pads exposed relative to a reciprocating member and delivered by said latter member to feed mechanism and intermittently fed by said mechanism along a support for the caps to the punch and die mechanism through a zone having an elevated temperature produced by an electric heating unit adjustably mounted superposed to the pads in the caps to heat the pads and adapted to be automatically moved to a position remotely of the caps when the apparatus is rendered inoperative. To provide and assemble impervious linings in the caps centrally of the pads a web of impervious material having an adhesive surface normally non-viscous is fed to the punch and die mechanism by means adapted to be rendered inoperative when no caps are positioned by the feed mechanism adjacent the punch and die mechanism. Lining disks are severed by the punch and die mechanism from the web and positioned by the punch in co-operation with a guide and support for the web centrally of and with the adhesive surface of the linings contiguous to the cap pads, the adhesive surface being rendered viscous through the heat of the pads. To effect an intimate adhesion between the linings and pads the caps with the pads and linings assembled therein are moved by the feed mechanism from the punch and die mechanism to means to place them under heat and pressure comprising electrically heated plungers actuated in synchronism with the punch and die mechanism and impinged against the linings and pads in the caps. To insure the complete adhesion between the linings and pads before discharging the assembled caps from the apparatus the caps are delivered from the electrically heated plungers to means to maintain the linings and pads under pressure during the cooling thereof.

In the drawings accompanying and forming a part of this application, Figure 1 is a side elevation of apparatus illustrating an embodiment of the invention and shown with the parts in inoperative condition.

Figure 2 is a view of the apparatus looking at the top of Figure 1.

Figure 3 is a plan view of the right hand end portion of the apparatus on an enlarged scale and partly in section.

Figure 4 is a sectional view taken on line 4—4 of Figure 3 looking in the direction of the arrows.

Figure 5 is a fragmentary elevational view of the central portion of the apparatus showing the actuating mechanism for the web feeding means.

Figure 6 is a sectional view taken on the line 6—6 of Figure 5 looking in the direction of the arrows.

Figure 7 is a detail view in perspective of controlling means for the actuating mechanism of the web feeding means.

Figure 8 is an end view of a detail of the actuating mechanism of the web feeding means.

Figure 9 is a perspective view of a web impinging roller carrier of the web feeding means.

Figure 10 is an elevational view partly in section, of punch and die mechanism and electrically heated pressure plungers.

Figure 11 is a sectional view of the punch and die mechanism taken on line 11—11 of Figure 10 looking in the direction of the arrows.

Figure 12 is a sectional view on an enlarged scale of the punch and die mechanism in position after severing a lining disk from the web and means to actuate a plunger to strip the severed disk from the punch and impinge it against the pad in a cap.

Figure 13 is a view similar to Figure 12 of the punch and die mechanism showing the punch positioning a severed lining disk in a cap centrally of the cap pad and the plunger about to impinge the severed lining against the pad in a cap.

Figure 14 is a view similar to Figure 13 of the punch and die mechanism and showing the plunger impinging the severed lining against the pad in a cap.

Figure 15 is a view similar to Figure 14 showing the punch receding and the plunger impinging the severed lining against the pad of a cap and stripping it from the punch.

Figure 16 is a sectional view of a heated plunger to place a lining and pad assembled in a cap under heat and pressure and showing the same in relation to a portion of the punch and die mechanism.

Figure 17 is a cross sectional view taken on the line 17—17 of Figure 16 looking in the direction of the arrows.

Figure 18 is a sectional plan view of means to guide the lining web relative to the punch and die mechanism.

Figure 19 is a plan view of a web roll and means to guide and feed the web from the roll to the punch and die mechanism.

Figure 20 is a side elevation looking at the bottom of Figure 19; and

Figure 21 is a sectional view taken on the line 21—21 of Figure 20 looking in the direction of the arrows, to show the connection between the means to feed the web to the punch and die mechanism with the means to feed the web from the web roll.

In the embodiment of the invention illustrated the operative parts are mounted upon a suitable framework comprising a table T supported upon standards S.

The caps C having sealing pads P usually of a cork composition adhesively secured therein, are delivered from a hopper (not shown) by a chute or slideway 14 arranged with flanged sides and top to prevent the caps from jamming or leaving the chute, and having a pivotally mounted gate 15 at the lowermost portion of the chute operated by a lever 16 to control the delivery of the caps from the chute, Figure 1. The caps are delivered from the chute to a tunnel-shaped guide member 17 extended from the end of the chute 14 in an arcuate direction, said guide being superposed and opened to the peripheral portion of a disk 18 rotatably supported by a sleeve 19 mounted on the table T to extend from the opposite faces thereof. The disk is rotated by a shaft rotatably carried by the sleeve 19 to extend from the ends of the sleeve with one end of the shaft fixed to the disk and having a pinion 20 fixed at the opposite end meshing with a pinion 21 fixed to a horizontal extending drive shaft 22 rotatably mounted in bearings 23 carried by the table T and standards S. The caps are moved from the outlet of the chute 14 along the member 17 by the rotation of the disk 18 to a position at the end thereof in alinement with a space between a pair of spaced rails 24 mounted above and parallelly of the table T by a series of supports 25 and having the opposite edges bevelled, as at 26, Figure 3, for the slidable support of the caps at opposite skirt portions to prevent the scratching or marring of the decorative surface thereof.

The caps are intermittently advanced or fed along the rails 24 by a feed rack embodying a plate 27 carried by a slide 27' mounted in recesses 28 of the supports 25 for one of the cap supporting rails 24 (Figure 4) to have longitudinal and lateral movement. The plate is arranged with laterally extending fingers or projections forming spaced recesses 29 substantially of the size and shape of the caps to engage the caps laterally and feed the same along the rails 24 by a reciprocatory movement thereof consisting of four separate quadrant stages produced through the rotation of a pair of disks 30 (only one of which is shown at the right of Figure 3) carried by shafts rotatably mounted in sleeves 31 extending from both surfaces of the table T similar to the sleeve 19, the shafts having pinion driving connections 32 with the drive shaft 22. The feed rack 27 is pivotally connected to the disks 30 eccentrically of the axis of the disks by arms 33 extended laterally of said rack plate adjacent opposite ends. By the rotation of the disks movement is imparted to the rack laterally to engage the rack fingers between and into engagement with the caps on the rails 24, then in a direction longitudinally of said rails to feed caps along the rails, then laterally to move the rack fingers out of engagement with the caps, and then longitudinally in reverse direction to position the rack fingers between successive caps on the rails 24.

The caps, as they are moved by the disk 18 from the guide 17, are engaged between guide ledges 34 extended downward from the opposite longitudinal marginal portions of a plate 34' hingedly carried by the guide member 17, as at 35, in alinement with the delivery end thereof to extend over the disk at the entrance to the space between the cap supporting rails 24 and to permit lifting of said guide plate away from the disk 18 to remove caps which may become jammed therein, or for inspection, cleaning or otherwise. The one guide ledge 34 is cut away at the entrance to the cap supporting rails for the delivery of the caps laterally from the disk 18 to said rails.

The movement of the caps through the rotation of the disk 18 along the guide ledges 34 is arrested by a stop 36 in the form of a finger extended from the end of one of the rails 24 at a right angle to the guide plate 34' to the end of the outer guide ledge 34. The cap abutting the extended rail portion 36 is moved forward onto the bevelled edges 26 of the rails 24 by an ejector member 37 pivotally mounted at one end on a supporting stud 38 on the table T, to extend over disk 18 and have oscillatory movement between said disk and guide ledges 34 and the extended rail portion 36 to engage the cap by a projection extended laterally from the free end, the free end of said ejector being in an arc, as at 39, to engage the successive cap and maintain the caps in their respective positions in the guide and chute during the delivery of the forward cap onto the rails 24. The ejector 37 is actuated by and in sequence with the movements of the feed rack through a link 40 pivotally connected at one end with the feed rack 27 and connected to the ejector member adjacent the mounting thereof by pin 42 fixed in and extending laterally from the ejector engaging a slot 41 in the link, the ejector being urged in a direction toward the guide 34' under the tension of a leaf spring 43 anchored on the ejector support and slidably engaging the pin 42 to assure the positive actuation of the ejector and to afford loose motion for the variations in the movements of the parts.

The longitudinal movement of the feed rack in a direction away from the disk 18 and the corresponding forward movement of the ejector 37 effected by the spring 43 will transfer the cap abutting the stop 36 onto the rails 24 into engagement with the end feeding finger of the rack slide 27, as shown in Figure 3. During the next two quadrant steps of the movement of the rack slide, the ejector 37 will be moved away from the guide 34' through the link connection thereof with the rack slide permitting the successive caps in the guide 17 to move by the force of the weight of the caps down the chute 14 and the rotation of the disk 18 positioning the foremost cap against the stop 36 opposite the ejector projection, the recess between the two fingers 29 at the end of the rack being positioned opposite the cap positioned by the ejector on the rails 24 and upon the successive movement of the feed rack towards the caps on the rails 24 positioning the end feed finger in the rear of such end cap on the cap supporting rail 24 and moving the rack fingers that were in front of caps to the rear of the respective caps on the rails 24. During the next step in the movement of the feed rack the caps on the rails are moved forward a distance equal to the width of the rack recesses, the cap in the forward recess being delivered from the rails and the foremost cap in the guide 34' transferred to the rails 24 by the ejector 37 in conjunction with the first slide projection as described.

To retain the caps on the rails 24 guide rails 44 are secured upon the tops of the rails 24 with the longitudinal marginal portion overhanging the beveled cap supporting edges of the rails, as shown in Figure 7.

To heat the pads P of the caps to render viscous an adhesive normally non-viscous, such as caoutchouc, carried either by said pads or the linings to be positioned on the pads, the caps are passed through a zone having an elevated temperature as they are moved along the rails 24 and produced by an electric heating unit 45 comprising an electric resistance wire embedded in a carrier having low electric conductivity and high thermal conductivity material arranged within a receptacle 46 pivotally mounted by arms 47 on one of the rails 24 to adjustably position the unit in superposed relation to the space between the rails and the exposed pads, as shown in full lines in Figure 4, and in a position remotely of the caps on the rails, as shown in dot and dash lines in said Figure 4. The terminals of the resistance wire are electrically connected to contact terminals of a connection plug member mounted on the receptacle, as at 46', for connection with a source of electricity by electric conductors 48 through the usual plug connection.

To prevent scorching of the pads of the caps arrested below the heating unit due to the rendering of the apparatus inactive through the disconnecting of the apparatus from the source of power, in the present instance effected by shifting a belt (not shown) from a pulley 52 fixed to the drive shaft to a pulley 53 loose on said shaft, said belt shifter comprising a rod 49 slidably mounted in brackets 50 on standards S and carrying a yoke member 51 for the passage and embracing the opposite edges of the belt. The belt shifter is actuated by a lever 54 pivotally mounted intermediate the ends thereof on the side of the table T, as at 55, and is offset as shown in Figure 2, to allow for the variation in the relative positions of the belt shifter bar 49 and the side of the table T for pivotal connection of the lower end of the lever with the shifter bar, as at 56, the opposite end of the lever being arranged with a hand grip 57 for the manipulation of the lever. The manipulation of the lever 54 actuates the heating unit to different positions relative to the rails 24 through a bell crank 58 pivotally mounted on top of the table T having one end thereof extended into the path of movement of and arranged to be engaged by the lever 54, and at the opposite end pivotally connected, as at 59, to one end of a link 60 having the opposite end 61 bent at a right angle and pivotally connected to an extended right angular portion 62 of one of the heating unit supporting arms 47. By the moving of the lever 54 to shift the belt to the pulley 52 the link 60 will assume the position shown in full lines in Figures 3 and 4, by the moving of the heating unit toward the caps on the rails 24 caused by the weight and the eccentric mounting of the heating unit relative to the extended portion 62. By actuating the lever 54 to shift the belt onto the loose pulley 53 the lever 54 will engage and move the bell crank 58 to the position shown in Figure 2, and through the link 60 the heating unit will be actuated away from the caps on the rails 24, as shown in dot and dash lines in Figure 4.

For the positioning and securing of impervious linings to the heated cap pads the caps are intermittently delivered by the reciprocation of the feed rack 27 to punch and die mechanism carried by a slide 63 mounted to have vertical sliding movement in a standard 64 fixed to the top of the table T, and said slide pivotally connected to a crank arm 65 connected with a strap 66 loosely encircling an eccentric 67 (Figure 6) fixed on the drive shaft 22 to impart reciprocatory movement to the slide. The slide is arranged with a laterally extending arm 68 fixedly carrying a punch 69 having an enlargement 70 at the end, as shown in Figures 10 to 15. The punch is extended through a perforation in the slide arm 68 and adjustably secured by a perforated plate 71 fixed in superposed relation to the arm 68 by studs 72 threaded in the arm and secured in alined perforations in the plate by nuts 73 threaded onto the studs and abutting both surfaces of the plate, the upper end of the punch being threaded and engaged in the perforation of the plate with an annular enlargement 74 on the punch abutting the under surface of the plate and secured to the plate by a nut 75 clamping the plate to the punch enlargement 74. The punch extends below the slide arm 68 in alinement with the space between the cap supporting rails 24 and a support in the form of a post 102 for a cap positioned relative to said support on the rails 24 by the feed rack 27 and co-operating with a die to sever linings from a web W. The web comprises a material which is not only impervious to moisture but also to the deteriorating action of the contents of a receptacle to which the closure cap is applied, usually comprising tin foil, having one face arranged with an adhesive coating, such as rubber, which is non-viscous under normal temperature and is adapted to be rendered viscous by an elevated temperature. The die comprises a tubular member 76 having an enlargement 77 at one end with a transverse recess therein of rectangular shape in cross section and of greater width than the diameter of the bore through the tubular portion 76 to serve as a guide and support for the web, the shoulder formed by said enlargement constituting the cutter edge of the die with which the punch co-operates to sever lining disks from the web, as shown at 78. The die is carried and slidably mounted on the punch to participate in the movement of the punch so that the punch and die may have movement relative to each other by a sleeve member 76' engaged upon the punch and extending through the perforation in the slide arm 68 through which the punch extends, said tubular member having an enlargement 77' with a transverse recess similar to the die 76 and arranged in opposed relation to said enlarged portion of the die, as shown in Figures 10 to 15. The tubular die portion slidably engages in a perforation of a support and guide 79 for the web W extending transversely of the table and through an opening 80 in the slide support 64 and an opening 80' in the slide 63, (Figure 11) and supported upon the bottom wall of the opening 80 and one of the supports 25 for a cap supporting rail 24, said guide and support 79 being arranged above and in contiguous relation to the cap supporting rails 24. The die has a predetermined movement through a perforation 79' in the guide 79 limited by the enlargement 77 of the die engaging the guide 79, to engage the tubular portion 76 with a pad P in a cap C fed along the rails 24 and positioned relative to the support 102 (Figures 13 and 14) to serve as a guide for a lining disk severed from the web by the punch and positioned by the punch to the cap pad on the support 102. The carrier sleeve 76' slidably engages a perforation in an inwardly extending annular flange 82 of a tubular member 81 superposed to the web support 79, said tubular member or housing 81 having oppositely disposed guide openings 81' in line with the guide recesses in the enlarged portions 77, 77' of the die 76 and its carrier 76'. The die is normally urged to position with the tubular portion 76 out of the path of travel of the caps upon the rails 24 by a spring 83 coiled about the sleeve 76' and confined between the flange 82 and nuts 84 threaded onto the sleeve 76'. The web is delivered from a roll R of such web to the punch and die mechanism with the adhesive surface lowermost, and in the operation of punching linings therefrom the punch is actuated to sever a lining disk from the web, the punch assuming substantially the position shown in Figure 12, the lining disk severed from the web being guided through the tubular portion of the die by the punch.

During this operation of the punch the die is retained in its uppermost position by the spring 83, and as the punch assumes the position shown in Figure 12 the slide arm 68 engages with the nuts 84 on the die carrier thereby imparting simultaneous movement to the punch and die and moving the tubular portion of the die 76 into engagement with the pad in the closure cap and the punch positioning the severed lining disk against the heated pin for adhesion thereto, as shown in Figure 13.

To effect adhesion of the severed lining to the sealing pad of the cap by the heat from the pad, pressure is applied to the severed lining before the cap is moved by the feed rack 27 away from the punch and die mechanism. This pressure is applied by a plunger 85 slidably mounted in the punch with the lower end arranged with a head 86 slidable in the enlargement 70 in the punch, the upward movement of the plunger being limited by the shoulder formed at the juncture of said head and plunger abutting the shoulder formed at the enlargement of the punch bore. The head 86 is normally positioned within the punch head 70, as shown in Figures 10, 12 and 13 by a spring 87 coiled about the plunger and confined between the punch nut 75 and a head 88 fixed to the end of the plunger. During the positioning of the severed lining in the cap by the punch and die, the plunger is actuated to impinge the lining against the cap pad, as shown in Figure 14, by a vertical reciprocatory kicker in the form of a plunger 89 slidably mounted in sleeve portions 90 and 92 extending parallelly from a standard 91 (Figures 10, 12 and 13) mounted on the table T at the side of the cap supporting rails 24. The kicker extends through perforation in the table and has a bifurcated head 93 fixed to the end rotatably carrying a roller 94 between the bifurcation legs to follow a cam 95 fixed to the drive shaft 22 to impart movement to the kicker in an upward direction just prior to the return movement of the slide 63, as shown in Figure 14. The kicker 89 is urged in a downward direction to cause the roller to follow the cam 95 by a spring 96 coiled about the kicker plunger 89 and confined between the sleeve 90 and a collar 97 fastened to the kicker above the sleeve 92. The kicker plunger 89 actuated the plunger 85 to impinge the head 86 of said plunger against the lining, as shown in Figures 14 and 15, through the engagement of a lever 98 pivotally mounted intermediate the ends thereof between the bifurcation legs of a head 99 fixed to the end of a post 100 fixed in and extending upward from the slide 63 and positioned between the punch mechanism and kicker plunger 89, one end of the lever engaging between the bifurcation legs of and pivotally connected to the head 88 of plunger 85, and the opposite end extending over an adjustable abutment 101, in the form of a set screw threaded in the end of the kicker plunger 89, the lever engaging said abutment at the end of the downward movement of the slide 63 of the punch and die engaging the pad in the cap, as shown in Figure 13. In said position the kicker is moved upward by the cam 95 engaging the abutment 101 with and rocking the lever 98 and moving the plunger 85 against the tension of spring 87 and impinging the plunger head 86 under pressure against the lining in a cap, as shown in Figure 14, and maintaining the plunger 85 in such position during the receding movement of the punch and die, as shown in Figure 15, the plunger head 86 also serving to strip the lining from the punch and die. The plunger head 86 recedes to its normal position at the commencement of the advancement of the caps on the rails 24 by the movement of the feed rack 27 in the direction toward the punch and die mechanism by the change of position of the roller 94 relative to the cam 95 effected by the rotation of the cam and the return of the kicker plunger 89 under the influence of the spring 96 and of the plunger 85 by the force of the spring 87.

The web W of lining material is fed to the punch and die mechanism along the support and guide 79 from a roll R of such web carried on a reel 103 rotatably supported by an arm 104 of a bracket 105 fixed to and extending from the table T. The web is fed from the web roll to the web support and guide 79 of the punch and die mechanism below a roller 106 rotatably supported between parallel side guide flanges 107 of said guide which terminate at the die housing 81 and continues at the opposite side of said housing. The web is delivered from below the roller 106 to the punch and die mechanism through the guide slots 81' of the die housing and enlargements 77, 77' of the die 76 and its carrier 76'.

The web is intermittently fed or drawn across the support and guide 79 relative to the punch and die mechanism by a pair of superposed rollers 108 and 109 fixed to rotatable shafts 110 and 111 and positively driven one from the other by meshing gears 112 and 113 fixed on the end of each of the shafts 110 and 111. The roller 109 is mounted between the legs of a U-shaped standard 114 fixed to and projecting up from the table T with the legs arranged with bifurcations 115 terminating above the mounting of the roller 109 and having ribs 116 extending from the opposed faces for the slidable engagement of grooves or slideways 117 arranged adjacent the marginal edges of a block 118 having a bifurcation 119 at the lower end with the bifurcation legs perforated for the mounting of the shaft of roller 108, the upper end of the block being weighted and flared outwardly to form a hand grip for the manipulating of the block to move the roller 108 out of and into engagement with the roller 109. The weight of the block maintains the gear 112 in mesh with gear 113 and the roller carried thereby in contact with roller 109. The rollers 108, 109 are rotated intermittently and during the period of rest of the punch and die mechanism and simultaneously with the feeding of the caps on the supporting rails 24, by a gear 120 fixed on a shaft 121 rotatable in lateral extensions 122 of the standard 114 and held against movement by a split collar 123 embracing and frictionally engaging the periphery of a disk 123' (Figure 8) with a predetermined force by a screw to draw the collar sections to the disk, and thus preventing overthrow and backlash of the feeding rollers. The collar is anchored on the standard 114 by a pin, as shown in Figures 2 and 8. The gear 120 meshes with the roller gear 113 and is intermittently rotated by the rotation of a ratchet wheel 124 fixed on the shaft 121 and intermittently rotated by a pawl 126 pivotally carried by a rocker, in the form of a plate 125 loosely mounted on the shaft 121 between the gear 120 and ratchet wheel 124, the pawl 126 being urged into engagement with the ratchet wheel by a spring 127. The rocker plate is rocked or reciprocated by a link 128 pivotally connected to an extension of the plate and to one end of a lever 129 pivotally mounted intermediate the ends thereof in a bifurcated bracket 130 fixed to and extending from the table T. The opposite end of the lever is arranged with an elongated slot 131 for the adjustable engagement of a bolt carried at one end of a rod 132, the opposite end of the rod being connected to a strap 133 loosely embracing an eccentric 134 fixed to the drive shaft 22, whereby reciprocatory movement is imparted to the rod 132 and through the lever and link connection thereof with the rocker plate actuating the rocker and as it is moved in one direction engaging the pawl and ratchet wheel and rotating said wheel and gear 120 a predetermined distance, which distance may be varied by the adjustment of the pin and slot connection 131 between the rod 132 and lever 129, the distance being determined by the length of the web desired to be fed measured by the diameter of the disk.

To prevent the breaking of the web due to the pull thereon by the feeding rollers 108, 109 from the reel 103, tensioning and supplementary feeding means are provided to feed the web from the web reel 103 to the punch and die mechanism, with a slack portion of the web W interposed between the web roll and the punch and die mechanism, said means comprising a flanged roller 135 rotatably mounted on an extension 136 of the bracket 105 extending at substantially a right angle to the reel carrier extension 104, about which roller the web is led from the web roll and guided to a flanged feed roller 137 fixed to one end of a shaft 138 rotatably supported by bracket 105 at the juncture of the extensions 104 and 136, the shaft 138 extending to the opposite side of the bracket 105 through a boss thereon and has a sprocket wheel 139 fixed thereto for operatively connecting and driving the roller 137 from the driving means for the feed rollers 108, 109, to intermittently rotate said roller 137 synchronously with the rollers 108, 109. This connection comprises a sprocket chain 140 engaging the sprocket wheel 139 and a sprocket wheel 141 fixed to a shaft 142 rotatably mounted in a bracket 143 supported on the table T adjacent to the standard 114, and operatively connected with the drive gear 120 by a gear 144 on shaft 142 meshing with a gear 145 rotatably supported by the bracket 143 and meshing with the roller gear 113, as shown in Figures 19 and 20. The web is maintained in contact with the roller 137 by the weight of an idler roller 146 rotatably carried to engage the web between the flanges of roller 137 adjacent one end of a lever 147 pivotally mounted at the opposite end on the bracket 105 and arranged to yieldingly urge the roller 146 into engagement with the web on roller 137 by a spring 148 coiled about the mounting of the lever with one end fixed to the arm 105 by bending the said end to engage under a flange of said arm and the opposite end of the spring bent laterally and engaged over the upper edge of the lever, as shown in Figure 19. From the roller 137 the web is led to the guide and support 79 under the roller 106 with the slack portion interposed, the roller 106 being arranged relative to the feeding rollers 108, 109 so that the web will extend in a substantially horizontal plane during the severing of a lining therefrom to assure an even severing of the lining.

To prevent the feeding of the web relative to the punch and die mechanism with a consequent waste thereof with no cap positioned on the supporting rails 24 in register with the punch and die mechanism, means are provided to hold the pawl out of engagement with the ratchet wheel upon the actuation of the pawl carrying rocker 125 and thereby prevent the rotation of the gears 120, 113 and 112, said means comprising a lever or bar 149 pivotally mounted intermediate the ends on the standard 114, one end of the lever extending over the cap rails 24 and being weighted, as at 150, to urge said end of the lever in a downward direction, and having a member 151 fixed thereto to extend in superposed relation to the cap engaging space between the rails 24 and having a finger extended into an indent 152 in the edge of the web guide 79 to be engaged by the flange of the caps to lift the weighted lever end 150 thereby rocking the lever to depress the opposite end, which is of curved formation, as at 153 in Figure 6, and engages below a pin 154 extending laterally from the pawl 126, this movement of the lever permitting the pawl to engage the ratchet wheel and actuation thereof by the rocking of the pawl carrying rocker 125 and the actuation of the feed rollers 108, 109 through the gears 120, 113 and 112. When there is no cap on the rails 24 below the finger of member 151 the member 151 will move by the weight of the end 150 downward between the rails 24, it being limited in this movement by an adjustable abutment in the form of a set screw 155 threaded into a vertical perforation in the end 150 to abut one of the guide edges 44, and this downward movement of the lever end 150 will move lever end 153 upward and through the engagement of said end with the pawl pin 154 move the pawl 126 out of engagement with the ratchet wheel 124, thereby stopping the rotation of the rollers 108, 109 through the breaking of the connection between the pawl carrying rocker 125 and gear 120.

To prevent the accumulation of the adhesive of the web on roller 109, which may be rendered somewhat viscous on the remaining portion of the web from which linings have been severed due to heat created by the operation of the punch and die mechanism, a scrapper in the form of a curved plate 156 is carried by angle brackets fixed to the standard extensions 122, one edge of said plate being arranged in scraping relation to the roller 109 and the other end extending to a lower plane for the disposal of the accumulation of the adhesive thereon by gravity.

To facilitate the threading of the web to the web feeding means a hand knob 110' is fixed to the extended end of the roller carrying shaft 110, and whereby web feeding movement may be imparted to the feed rollers 108, 109.

To assure an intimate adhesion of the severed linings positioned on the pads P the caps are advanced from the punch and die mechanism by the reciprocation of the feed rack 27 to means to successively subject the linings assembled on the pads in caps to heat and pressure. This means comprises a pair of heated plungers slidably mounted in the arm 68 of the slide 63 in parallel relation to the punch and die and moved by the movement of the slide into and out of engagement with caps on the supporting rails 24 positioned in alinement with said plungers. Each of the plungers comprises a tubular shank 157 slidably mounted in a bore in the slide arm 68, the end of the shank extending above the member 68 having an annular enlargement 158 to abut the member 68 to limit the downward movement of the shank. The lower end of the shank carries a head in the form of a plug 159 of heat conducting material and of a diameter equal to the diameter of the lining, said head being threaded into the bore of the shank and carrying an electric heating unit to heat the same, comprising a carrier 160 of electric insulating and heat conducting material having embedded therein an electric resistance wire 161 connected to a source of electricity by conductors 162 supported by a terminal plug 163 of insulating material inserted in the bore of the shank at the upper end with an annular enlargement thereof abutting the end of the shank and enclosed in a cap member 164 threaded onto the end of the shank extending beyond the enlargement 158, the cap having an opening therethrough for the passage of the conductors leading from a recess 165 to accommodate the plug 163 and the electrical connections of the conductors therewith. The head 159 is maintained with a yielding pressure against a lining positioned in a cap during the downward movement of the slide 63 by a spring 167 coiled about the shank and confined between a collar 166 fixed on the lower end of the shank and the slide arm 68, the collar 166 also limiting the movement of the head 159 toward the cap on the rails 24 by engaging with the rails 44 to retain the caps on the supporting rails 24. By this arrangement sufficient force is applied to the lining without forcing the cap through the bevelled edges 26 of the rails 24 and assure an intimate adhesion of the linings to the pads. Both of the plungers are of similar structure and operate simultaneously upon different caps during the period of rest of the caps on the rails 24.

To maintain an intimate adhesion of the linings to the pads the caps are advanced from the heating plungers to means to place them under pressure as they cool. This means comprises a disk 168 fixed on a shaft 169 rotatably supported at one end in a bearing sleeve 170 fixed to the table T and in a hub portion of a bracket 171 mounted on the table T to extend upward and overhang the disk 168. The shaft 169 is rotated through a gear 172 fixed to the shaft and meshing with a pinion 173 fixed to one end of a shaft 173' rotatably supported in a bearing sleeve 174 fixed to and extending below the table T, a bevel gear 175 on the lower end of the shaft meshing with a bevel pinion 176 fixed to the drive shaft 22. The upper surface of the table is in a plane with the cap supporting rails 24, and the caps are delivered from said rails to the table by the feed rack 27. To place the linings assembled on pads on the table under pressure to maintain an intimate adhesion of the linings when the caps are cooled a series of plungers 177 are circumferentially spaced around the table, said plungers being slidably carried by a pair of superposed ring members 178, 179 fixed in spaced relation on the shaft 169 superposed to the table 168. The plungers are urged into engagement with the table by springs 182 coiled about the plungers with one end fixed to the plungers and the opposite end abutting against the upper ring member 178. The ratio of the gearing 172 to 176 is such so as to rotate the table a distance equal to the spacing of the plungers 177 upon each cap feeding movement of the feed rack 27 and thus deliver caps from the supporting rails 24 to the successive plungers 177.

To release the plungers from the caps on the table and permit the positioning of caps on the table 168 in interposed relation to the plungers, each plunger carries a roller on a stud fixed in the plunger above the ring member 178 to extend laterally of the periphery of said ring member 178, as shown at 181, which rollers ride up an arcuate cam member 180 supported upon the table T by the rotation of the plungers with the table 168, thus moving the plungers successively away from the table against the tension of the springs 182 and maintaining them in such position until they pass the delivery end of the rails 24 and a cap has been delivered onto the table and positioned relative to a plunger when the plunger rollers ride off from the cam member and the plunger engages a cap on the table positioned relative thereto. As the plunger rollers 181 ride up the cam 180 and the plungers are moved out of engagement with caps on the table such caps by the rotation of the table engage an abutment (not shown) intersecting the path of travel of the caps and arranged to direct the caps from the table to a chute 183.

It will be obvious that various modifications may be made in the construction and arrangement of parts without departing from the scope of the invention, and that portions of the invention may be used without others and come within the scope of the invention.

Having thus described my invention, I claim:

1. In apparatus for assembling and securing impervious linings to pads in closure caps, punch and die mechanism having a diameter less than the pads, means to intermittently feed and position caps to the punch and die mechanism and pass the caps through a zone having an elevated temperature, means to feed a web of impervious material having an adhesive surface normally non-viscous to the punch and die mechanism to be severed into lining disks of less diameter than the pads and positioned by the punch in the heated caps with the adhesive surface opposed to the pads to effect a fusion of the adhesive and uniting the linings to the pads, and means to guide and position the linings centrally of the cap pads.

2. In apparatus for assembling and securing impervious linings to pads in closure caps, punch and die mechanism, a cap support, means to intermittently feed and position caps on the support relative to the punch and die mechanism and to pass the caps through a zone having an elevated temperature, means to feed a web of impervious material having an adhesive surface normally non-viscous from a roll of such web to the punch and die mechanism to be severed into linings and positioned by the punch and die mechanism in the caps to effect an adhesion between the linings and the pads, and said feeding means normally inoperative to feed the web and adapted to be rendered operative by a cap on the support to be positioned relative to the punch and die mechanism upon the successive actuation of the cap feeding means.

3. In apparatus for assembling and securing impervious linings in closure caps, punch and die mechanism, means to intermittently feed and position caps relative to the punch and die mechanism and pass the caps through a zone having an elevated temperature to heat the same as they are fed to the punch and die mechanism, means to feed a web of impervious material having an adhesive surface normally non-viscous to the punch and die mechanism to be severed into linings and positioned by the punch and die mechanism in the caps and the adhesive surface thereof rendered viscous by the heated cap, and means to which the caps with the impervious linings assembled therein are delivered from the punch and die mechanism to place the linings under heat and pressure to effect intimate adhesion between the linings and the caps.

4. Apparatus for assembling and securing impervious linings in closure caps as claimed in claim 3, wherein the die is arranged to guide and the punch to position the linings severed from the web centrally of the caps.

5. In apparatus for assembling and securing impervious linings in closure caps, reciprocatory punch and die mechanism, means to intermittently feed and position caps to the punch and die mechanism, means to feed a web of the lining material having an adhesive surface normally non-viscous to the punch and die mechanism to be severed into linings and positioned by the punch and die mechanism in the caps, means to which the caps with the linings are delivered from the punch and die mechanism to place the linings under heat and pressure to effect an intimate adhesion of the linings in the caps, and means to which the caps are delivered from said latter means to place the same under pressure to maintain adhesion between the linings and caps during the cooling period.

6. In apparatus for assembling and securing linings in closure caps, reciprocatory punch and die mechanism, means to intermittently feed and position caps to the punch and die mechanism and pass the caps through a zone having an elevated temperature to heat the same, means to feed a web of lining material having an adhesive surface normally non-viscous to the punch and die mechanism to be severed into linings, the lining severed from the web being positioned by the punch in a cap, and the die being arranged to engage in the cap and guide the lining as it is positioned by the punch in the cap, means to which the caps with the linings are delivered from the punch and die mechanism to place the linings in the caps under heat and pressure to effect an intimate adhesion thereof, and means to which the caps are delivered from said latter means to place the same under pressure during the cooling to effect and maintain adhesion between the linings and the caps.

7. In apparatus for assembling and securing linings in closure caps, punch and die mechanism, means to intermittently feed and position the caps to the punch and die mechanism, heating means to produce a zone having an elevated temperature to heat the caps as they are fed to the punch and die mechanism, said heating means being adjustably supported superposed to the path of travel of the caps, means to feed a web of lining material having an adhesive surface to the punch and die mechanism to be severed into linings and positioned by the punch and die mechanism in the caps to effect an adhesion of the linings to the caps, and means to render the apparatus operative and inoperative and adapted when actuated to render the apparatus operative to position the heating means superposed to the travel of the caps and move the heating means to a position remote to the travel of the caps when said means is actuated to render the apparatus inoperative.

8. In apparatus for assembling and securing linings to pads in closure caps, punch and die mechanism, a support for a series of caps below and intersecting the axis of the punch and die mechanism, means to intermittently feed and position caps on said support relative to the punch and die mechanism and pass the caps through a zone having an elevated temperature as they are fed to the punch and die mechanism to heat the pads, means to feed a web of lining material having an adhesive surface normally non-viscous to the punch and die mechanism to be severed into linings and positioned in the caps centrally of the pads by the punch and die mechanism, and means operative synchronously with the actuation of the punch and die mechanism to which the caps with linings are delivered from the punch and die mechanism to place the linings under heat and pressure to render the same viscous and effect an adhesion between the linings and the pads.

9. In apparatus for assembling and securing linings to pads in closure caps, punch and die mechanism, a support for a series of caps arranged below and intersecting the axis of the punch and die mechanism, means to intermittently feed and position caps on said supporting means relative to the punch and die mechanism and pass the caps as they are fed to the punch and die mechanism through a zone having an elevated temperature to heat the pads, means intermittently operative to successively deliver the caps relative to said feeding and positioning means, and means to feed a web of lining material having an adhesive surface normally non-viscous to the punch and die mechanism to be severed into linings and positioned in the caps centrally of the pads by the punch and die mechanism to effect an infusion of the adhesive and adhesion between the linings and the pads.

10. In apparatus for assembling and securing linings to pads in closure caps, punch and die mechanism, a support for a series of caps, means to intermittently feed and position caps on said support relative to the punch and die mechansm and pass the caps as they are fed to the punch and die mechanism through a zone having an elevated temperature to heat the pads, means operative in sequence with the actuation of the cap feeding and positioning means to deliver the caps to the support relative to said feeding and positioning means, and means to feed a web of lining material having an adhesive surface normally non-viscous to the punch and die mechanism to be severed into linings and positioned in the caps centrally of the pads by the punch and die mechanism to effect an infusion of the adhesive and adhesion between the linings and the pads.

11. In apparatus for assembling and securing linings to pads in closure caps, punch and die mechanism, means to support caps in alinement with the punch and die mechanism, means to intermittently feed and position caps on said supporting means to the punch and die mechanism, means to supply the caps to the supporting means relative to said feeding and positioning means, an electric heating unit intermediate the punch and die mechanism and the cap supplying means and superposed to the travel of the caps for producing an elevated temperature to heat the pads in the caps, and means to feed a web of lining material having an adhesive surface normally non-viscous to the punch and die mechanism to be severed into linings and positioned in the caps centrally of the pads by the punch and die mechanism to effect an adhesion between the linings and the pads.

12. In apparatus for assembling and securing linings to pads in closure caps, punch and die mechanism, means to support caps in alinement with the punch and die mechanism, means to intermittently feed and position caps on said supporting means to the punch and die mechanism and pass the caps through a zone having an elevated temperature to heat the pads, means to supply caps to the supporting means relative to said feeding and positioning means comprising a rotatable disk to support and aline caps thereon with the supporting means and a finger reciprocated by the actuation of the cap feeding and positioning means to deliver caps from the disk to the supporting means relative to the feeding and positioning means, and means to feed a web of lining material having an adhesive surface normally non-viscous to the punch and die mechanism to be severed into linings and positioned in the caps relative to the pads by the punch and die mechanism to effect an adhesion between the linings and the pads.

13. In apparatus for assembling and securing linings to pads in closure caps, punch and die mechanism, a support for a series of caps intersecting the axis of the punch and die mechanism, means to intermittently feed and position caps on said support to the punch and die mechanism, an adjustable electric heating unit to be positioned to extend in superposed relation to the pads in the travel of the caps on the support as they are fed to the punch and die mechanism to heat the pads and be adjusted to a position remote to the caps on the support, and means to feed a web of lining material having an adhesive surface normally non-viscous from a roll of such material to the punch and die mechanism to be severed into linings and positioned in the caps centrally of the heated pads by the punch and die mechanism to effect an adhesion between the linings and the pads.

14. In apparatus for assembling linings in closure caps, punch and die mechanism, means to support a cap relative to the punch and die mechanism, means to feed a web of lining material to the punch and die mechanism to be severed into linings and positioned centrally in the caps by the punch and die mechansm, a support and guide for the web interposed between the punch and die mechanism and cap supporting means to one end of which the web is delivered from a web roll with a slack portion between the web roll and support and guide, and intermittently operative means arranged at the opposite end of said support and guide to draw the web across the support and guide relative to the punch and die mechanism in the inoperative position thereof.

15. In apparatus for assembling linings in closure caps, punch and die mechanism, means to support a cap relative to the punch and die mechanism, means to feed a web of lining material from a roll of such web to the punch and die mechanism to be severed into linings and the linings positioned in the caps by the punch and die mechanism comprising a support and guide for the web to the punch and die mechanism, intermittently operative means arranged at one end of the support and guide to draw the web across the same, and intermittently operative means to deliver the web from the web roll to the opposite end of the support and guide with a slack portion of the web interposed between said latter means and the support and guide, the web drawing and delivering means being actuated in synchronism with each other.

16. Apparatus for assembling linings in closure caps as claimed in claim 15, wherein the intermittently operative means to draw the web across the support and guide comprises a pair of rollers between which the web is engaged, a ratchet wheel operatively connected with said rollers, a rocker pivotally supported on the axis of the ratchet wheel, a pawl pivotally carried by said rocker to engage the ratchet wheel, and means to oscillate the rocker.

17. Apparatus for assembling linings in closure caps as claimed in claim 15, wherein the means to deliver the web from the web roll to the support and guide comprises an intermittently rotated roller, and rollers to guide the web from the web roll to and maintain it in contact with said intermittently rotated roller.

18. In apparatus for assembling linings in closure caps, punch and die mechanism, means to support a cap relative to the punch and die mechanism, means to feed a web of lining material from a roll of such web to the punch and die mechanism to be severed into linings and the linings positioned in the caps by the punch and die mechanism comprising a support and guide for the web to the punch and die mechanism, a pair of rollers arranged at one end of the support and guide between which the web is engaged and operative to draw the web across the support and guide, a ratchet wheel operatively connected with said rollers, a rocker carrying a pawl to cooperate with the ratchet wheel to effect intermittent rotation thereof and intermittent feeding movements of the rollers, a roller arranged at the opposite end of the support and guide to deliver the web from the web roll, said roller being operatively connected with and intermittently rotated from the ratchet wheel, and rollers to guide the web from the web roll and maintain the web in contact with the latter feed roller.

19. In apparatus for assembling and securing linings to pads in closure caps, punch and die mechanism, a cap support, means to feed and position caps on the support relative to the punch and die mechanism, means to feed a web of lining material having an adhesive surface normally non-viscous to the punch and die mechanism to be severed into linings and positioned in the caps centrally of and with the adhesive surface abutting the pads by the punch and die mechanism, and electrically heated plungers to which the caps are successively delivered from the punch and die mechanism to place the linings under heat and pressure and effect an intimate adhesion between the linings and the pads.

20. In apparatus for assembling and securing linings to pads in closure caps, punch and die mechanism, a cap support, means to feed and position caps on the support relative to the punch and die mechanism, means to feed a web of lining material having an adhesive surface normally non-viscous to the punch and die mechanism to be severed into linings and positioned in the caps centrally of and with the adhesive surface abutting the pads by the punch and die mechanism, electrically heated plungers to which the caps are successively delivered from the punch and die mechanism to place the linings under heat and pressure and effect an intimate adhesion between the linings and the pads, and means to which the caps with the linings are delivered from the heated plungers to place the pads and linings under pressure during the cooling thereof.

21. In apparatus for assembling linings in closure caps, a cap support, punch and die mechanism superposed to the cap support to sever linings from a web of lining material having an adhesive surface and position the severed linings in a cap on the cap support comprising a reciprocatory punch and a tubular die slidable on and reciprocatory with the punch and one movable relative to the other, said die being arranged to engage within the cap on the support and guide a severed lining as it is positioned by the punch in the cap.

22. In apparatus for assembling linings in closure caps as claimed in claim 21, means to engage and hold the lining to the cap and strip the lining from the punch and die as they recede from the cap.

23. In apparatus for assembling linings in closure caps as claimed in claim 21, wherein the punch is tubular, a plunger slidable in the punch operative to engage and hold the lining to the cap and strip the lining from the punch and die as they recede from the cap.

24. In apparatus for assembling linings in closure caps, a cap support, means to sever a lining from a web and position the same in a cap on the support comprising a die arranged with a support for the web from which the linings are severed, said die being slidably supported in superposed relation to the cap support and having a tubular portion opposed to the cap support to engage within the cap, said die being normally urged in a direction from the cap support, a punch slidable in the die to sever the lining from the web, and means to actuate said punch and die to engage the tubular portion of the die within the cap, sever the lining from the web by the punch and guide the severed lining through the tubular portion of the die to position in the cap.

25. In apparatus for assembling linings in closure caps as claimed in claim 24, means operative in sequence with the operation of the punch and die to engage the lining in the cap and strip the lining from the punch and die as they recede from the cap.

26. In apparatus for assembling linings in closure caps as claimed in claim 24, a plunger slidably mounted in the punch and normally urged to predetermined position within the punch, and means to actuate and engage said plunger with the lining positioned in the cap by the punch to hold the lining in the cap and strip the same from the punch and die as they recede from the cap.

27. In apparatus for assembling and securing linings to sealing pads in closure caps, punch and die mechanism, a cap support, means to intermittently feed and position caps on the support relative to the punch and die mechanism, means to heat the cap pads as they are fed to the punch and die mechanism, means to feed a web of lining material having an adhesive surface normally non-viscous to the punch and die mechanism for the severing of linings from the web and positioning of the linings relative to the heated pads in the caps by the punch and die mechanism, and means carried by the punch to forcibly impinge the lining against the heated cap pad and effect adhesion of the lining to the cap pad, said means being actuated in sequence to the positioning of the severed lining relative to the cap pad by the punch and die mechanism.

28. The method of assembling linings for sealing pads in receptacle closure caps, consisting in providing caps with sealing pads therein and a web of lining material arranged with an adhesive surface non-viscous at normal temperature, heating the pads in the caps, and severing linings from the web of lining material and assembling the linings as they are severed from the web in the caps with the adhesive surface in contact with the heated pads to render the adhesive viscous and effect adhesion of the linings to the pads.

29. The method of assembling linings for sealing pads in receptacle closure caps, consisting in providing caps with sealing pads therein and a web of lining material arranged with an adhesive surface non-viscous at normal temperature, heating the pads in the caps, severing linings from the web of lining material and assembling the linings as they are severed from the web in the caps with the adhesive surface in contact with the heated pads to render the adhesive viscous and effect adhesion of the linings to the pads, and then placing the linings in the caps under heat and pressure to effect an intimate adhesion between the linings and pads.

30. The method of assembling linings for sealing pads in receptacle closure caps, consisting in providing caps with sealing pads therein and a web of lining material arranged with an adhesive surface non-viscous at normal temperature, heating the pads in the caps, severing the linings from the web of lining material and assembling the linings as they are severed from the web in the caps with the adhesive surface in contact with the heated pads to render the adhesive viscous and effect adhesion of the linings to the pads, then placing the linings in the caps under heat and pressure to effect an intimate adhesion between the linings and pads, and then placing the linings assembled in the caps under pressure during the cooling thereof.

Signed at borough of Brooklyn, in the county of Kings and State of New York, this 18th day of November, A. D. 1929.

JOHN A. JOHNSON.